United States Patent
Stoyanov et al.

(10) Patent No.: US 10,920,617 B2
(45) Date of Patent: Feb. 16, 2021

(54) GAS TURBINE ENGINE SEAL RING ASSEMBLY

(71) Applicant: United Technologies Corporation, Farmington, CT (US)

(72) Inventors: Pantcho P. Stoyanov, West Hartford, CT (US); Mark B. Gossner, Durham, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 244 days.

(21) Appl. No.: 16/104,153

(22) Filed: Aug. 17, 2018

(65) Prior Publication Data
US 2020/0056506 A1 Feb. 20, 2020

(51) Int. Cl.
*F01D 25/18* (2006.01)
*F02C 7/28* (2006.01)

(52) U.S. Cl.
CPC ............ *F01D 25/183* (2013.01); *F02C 7/28* (2013.01); *F05D 2240/55* (2013.01); *F05D 2240/60* (2013.01); *F05D 2260/98* (2013.01); *F05D 2300/2291* (2013.01)

(58) Field of Classification Search
CPC ...... F01D 25/183; F02C 7/28; F05D 2240/60; F05D 2240/55; F05D 2260/98; F05D 2300/2291
USPC ......................................................... 415/111
See application file for complete search history.

(56) References Cited

U.S. PATENT DOCUMENTS

| | | | | |
|---|---|---|---|---|
| 3,497,272 A | * | 2/1970 | Jacques | F16C 33/04 384/42 |
| 3,847,506 A | * | 11/1974 | Straniti | F01D 5/08 416/244 R |
| 3,914,178 A | * | 10/1975 | Fineran | F16B 33/06 508/103 |
| 4,047,837 A | * | 9/1977 | Hueber | F01D 5/081 416/95 |
| 4,536,932 A | | 8/1985 | Athey | |
| 4,875,830 A | | 10/1989 | Trousdell et al. | |

(Continued)

FOREIGN PATENT DOCUMENTS

| | | | | |
|---|---|---|---|---|
| CN | 101201081 A | * | 6/2008 | ............ F16C 33/201 |
| CN | 202790112 U | * | 3/2013 | |

(Continued)

OTHER PUBLICATIONS

International Search Report and Written Opinion for Application No. PCT/2014/031163 dated Jul. 24, 2014.

(Continued)

*Primary Examiner* — J. Todd Newton
(74) *Attorney, Agent, or Firm* — Carlson, Gaskey & Olds, P.C.

(57) ABSTRACT

A rotor assembly for a gas turbine engine according to an example of the present disclosure includes, among other things, a rotor that has a hub carrying one or more rotatable blades. The rotor is mechanically attached to a shaft, and an annular seal is carried by the shaft. The annular seal includes a substrate and a first layer disposed on the substrate. The first layer includes copper, and a second layer is disposed on the first layer and arranged to establish a sealing relationship with the rotor. The second layer includes a solid lubricant. A method of sealing is also disclosed.

20 Claims, 6 Drawing Sheets

(56) References Cited

U.S. PATENT DOCUMENTS

| | | | |
|---|---|---|---|
| 4,950,503 A * | 8/1990 | Scherer | C23C 24/085 427/123 |
| 5,292,138 A * | 3/1994 | Glynn | F16J 15/164 277/422 |
| 5,537,814 A | 7/1996 | Nastuk et al. | |
| 5,632,600 A | 5/1997 | Hull | |
| 5,702,769 A * | 12/1997 | Peters | C23C 4/04 427/450 |
| 5,988,980 A | 11/1999 | Busbey et al. | |
| 6,123,009 A * | 9/2000 | Kanayama | C23C 28/00 92/71 |
| 6,422,818 B2 | 7/2002 | Mashey | |
| 8,157,514 B2 | 4/2012 | Reyes et al. | |
| 2006/0063637 A1 | 3/2006 | Law | |
| 2008/0304972 A1 | 12/2008 | Xiao | |
| 2011/0182745 A1 | 7/2011 | Suciu et al. | |
| 2011/0255991 A1 | 10/2011 | Borufka et al. | |
| 2012/0112415 A1 * | 5/2012 | Benjamin | F16J 9/14 277/303 |
| 2012/0282098 A1 * | 11/2012 | Stiehler | F01D 11/006 416/146 R |
| 2012/0282109 A1 * | 11/2012 | Stiehler | F02C 7/18 416/97 R |
| 2012/0308381 A1 | 12/2012 | Suciu et al. | |
| 2015/0204383 A1 * | 7/2015 | Ishii | F04B 53/14 384/297 |
| 2016/0298459 A1 | 10/2016 | Bryant et al. | |
| 2020/0166163 A1 * | 5/2020 | Goto | C10M 107/38 |

FOREIGN PATENT DOCUMENTS

| | | | | |
|---|---|---|---|---|
| CN | 203974456 U | * | 12/2014 | B60G 11/00 |
| CN | 105339604 A | * | 2/2016 | F01K 25/00 |
| CN | 205330927 U | * | 6/2016 | |
| CN | 205330928 U | * | 6/2016 | |
| CN | 105861886 A | * | 8/2016 | |
| CN | 205533082 U | * | 8/2016 | |
| CN | 106048400 A | * | 10/2016 | |
| CN | 108547874 A | * | 9/2018 | |
| EP | 2453150 | | 5/2012 | |
| EP | 2520764 | | 11/2012 | |
| EP | 2520768 | | 11/2012 | |
| EP | 2562364 | | 2/2013 | |
| JP | H10183327 | | 7/1998 | |
| JP | 2007023352 | | 2/2007 | |
| WO | WO-2016073193 A1 | * | 5/2016 | B22F 1/0003 |

OTHER PUBLICATIONS

The International Preliminary Report on Patentability for PCT Application No. PCT/US2014/031163, dated Oct. 22, 2015.
Supplementary European Search Report for Application No. 14783310.7 dated May 20, 2016.
MoS2 low friction coatings. Hale Performance Coatings. Retrieved Jul. 3, 2018 from: http://industrialcoatingsworld.com/low-friction-coatings/mos2-loaw-friction-coatings.
European Search Report for European Patent Application No. 19191120.5 completed Dec. 10, 2019.

* cited by examiner

GAS TURBINE ENGINE SEAL RING ASSEMBLY

BACKGROUND

This disclosure relates to sealing components of a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

The compressor section can include rotors that carry airfoils to compress the air entering the compressor section. A shaft may be coupled to the rotors to rotate the airfoils.

SUMMARY

A rotor assembly for a gas turbine engine according to an example of the present disclosure includes a rotor that has a hub carrying one or more rotatable blades. The rotor is mechanically attached to a shaft, and an annular seal is carried by the shaft. The annular seal includes a substrate and a first layer disposed on the substrate. The first layer includes copper, and a second layer is disposed on the first layer and arranged to establish a sealing relationship with the rotor. The second layer includes a solid lubricant.

In a further embodiment of any of the foregoing embodiments, the substrate comprises a nickel alloy.

In a further embodiment of any of the foregoing embodiments, the first layer comprises aluminum or nickel, and the solid lubricant comprises molybdenum disulfide ($MoS_2$).

In a further embodiment of any of the foregoing embodiments, the first layer has a composition, by weight percent, 60% to 95% copper.

In a further embodiment of any of the foregoing embodiments, the rotor is an integrally bladed rotor.

In a further embodiment of any of the foregoing embodiments, the first layer has a composition, by weight percent, 85% to 95% copper, and aluminum.

In a further embodiment of any of the foregoing embodiments, the first layer has a composition, by weight percent, 60% to 65% copper, and nickel.

In a further embodiment of any of the foregoing embodiments, the annular seal is a split ring including a first end that engages with a second, opposed end.

In a further embodiment of any of the foregoing embodiments, the substrate of the annular seal is seated in an annular groove defined by an outer diameter portion of the shaft, and the second layer abuts against an inner diameter portion of the hub.

In a further embodiment of any of the foregoing embodiments, the integrally bladed rotor is a compressor rotor, and the solid lubricant comprises molybdenum disulfide ($MoS_2$).

A gas turbine engine according to an example of the present disclosure includes a fan section that has a fan, a compressor section that has a compressor, a turbine section that has a turbine driving the compressor, and a shaft rotatable about an engine longitudinal axis. The compressor section has a rotor assembly. The rotor assembly has a rotor that has a hub carrying a plurality of rotatable blades. The rotor is mechanically attached to the shaft. A piston ring is carried by the shaft. The piston ring includes a first layer of copper alloy disposed on a substrate, and a second layer that abuts against the hub to establish a sealing relationship. The second layer includes a solid lubricant.

In a further embodiment of any of the foregoing embodiments, the rotor is an integrally bladed rotor.

In a further embodiment of any of the foregoing embodiments, the solid lubricant comprises molybdenum disulfide ($MoS_2$).

In a further embodiment of any of the foregoing embodiments, the compressor section includes a low pressure compressor and a high pressure compressor, and the integrally bladed rotor is a high pressure compressor rotor of the high pressure compressor.

A method of sealing for a gas turbine engine according to an example of the present disclosure includes forming a piston ring including a first layer of copper alloy disposed on a substrate, and a second layer that abuts against a rotor to establish a sealing relationship, the second layer including a solid lubricant, and mechanically attaching the rotor to a rotatable shaft. The rotor has a hub carrying one or more rotatable blades.

In a further embodiment of any of the foregoing embodiments, the rotor is an integrally bladed rotor.

In a further embodiment of any of the foregoing embodiments, the solid lubricant comprises molybdenum disulfide ($MoS_2$).

In a further embodiment of any of the foregoing embodiments, the step of forming includes depositing the second layer directly on the first layer.

The method as recited in claim 17, the method includes removing a layer of copper alloy from the piston ring prior to the forming step.

In a further embodiment of any of the foregoing embodiments, the hub defines a seal land that forms a sealing relationship with the second layer, and further forms a third layer on the seal land. The third layer has molybdenum disulfide ($MoS_2$).

The various features and advantages of this disclosure will become apparent to those skilled in the art from the following detailed description. The drawings that accompany the detailed description can be briefly described as follows.

DETAILED DESCRIPTION

Figure 1:
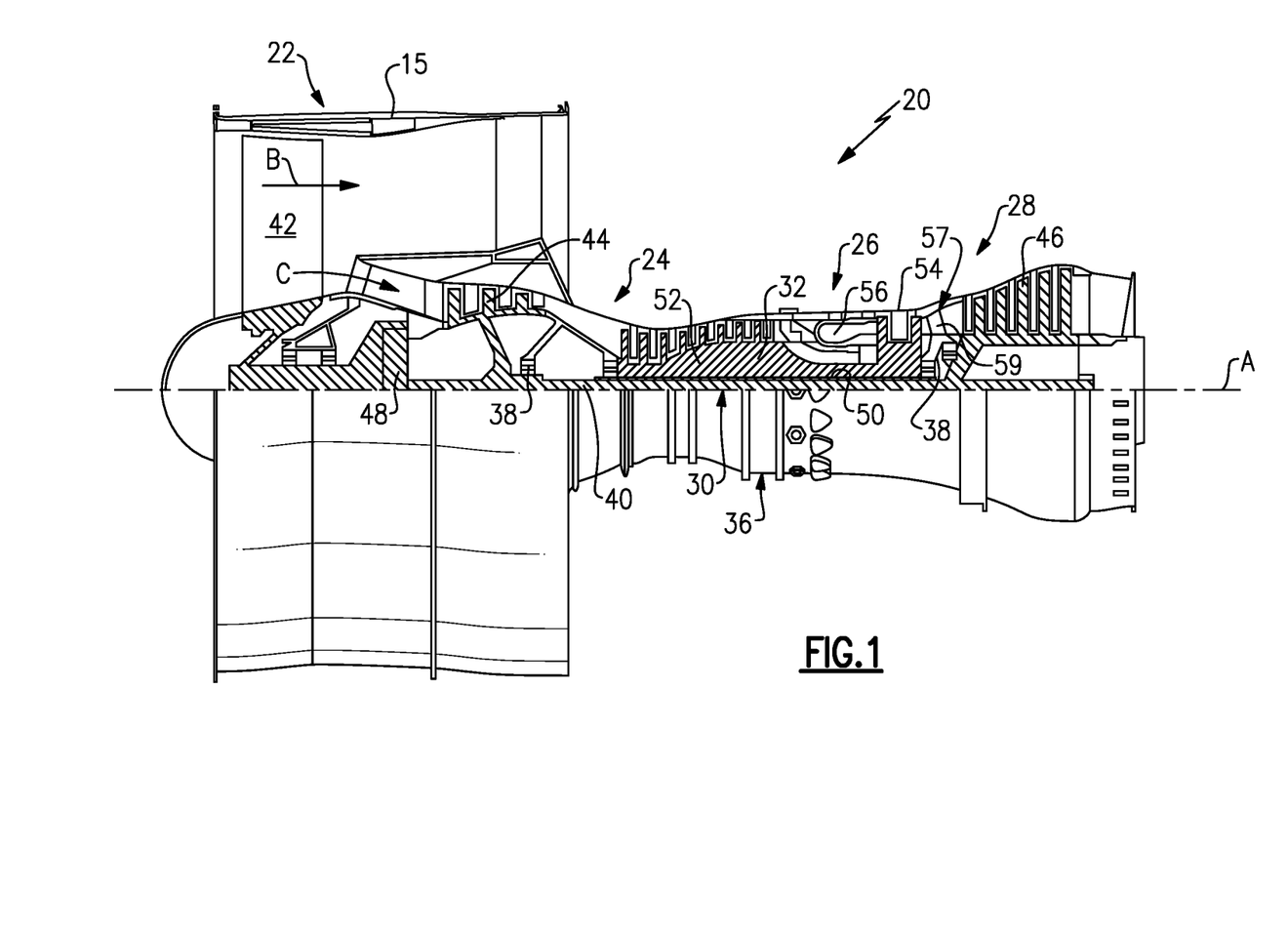
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Figure 2:
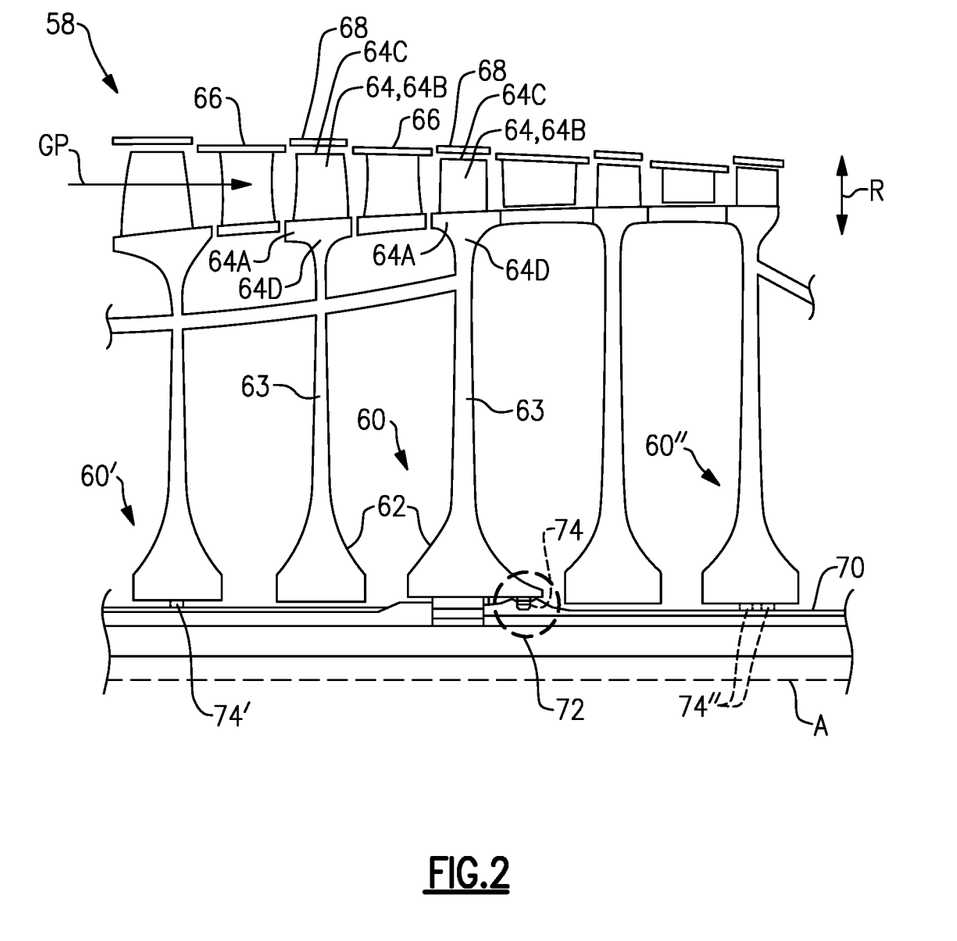
FIG. 2 illustrates a rotor assembly for a gas turbine engine.

FIG. 2 illustrates a rotor assembly 60 for a section 58 of a gas turbine engine, such as the compressor section 24 of FIG. 1. Although the disclosure primarily refers to the compressor section 24, other portions of the engine 20 may benefit from the teachings herein, such as the fan and turbine sections 22, 28, towershafts and auxiliary systems. Other systems may also benefit from the teachings herein, including marine and ground based systems.

The section 58 includes a plurality of rotors 62 each including a disk or hub 63 that carries one or more rotatable blades or airfoils 64. The airfoils 64 are rotatable about the engine axis A in a gas path GP, such as core flow path C. Each airfoil 64 includes a platform 64A and an airfoil section 64B extending in a spanwise or radial direction R from the platform 64A to a tip 64C. A root section 64D of each airfoil 64 extends outwardly from, and is mounted to, a respective hub 63. In some examples, the root section 64D is received in a slot defined by the hub 63. In the illustrated example of FIG. 2, the rotor 62 is a blisk or integrated bladed rotor (IBR) in which the airfoils 64 are integrally formed with the hub 63. In some examples, the IBR is a compressor rotor, such as a high pressure compressor rotor of the high pressure compressor 52 or a low pressure compressor rotor of the low pressure compressor 44. Various techniques can be utilized to form the IBR, such as casting, additive manufacturing, machining from a solid work piece, or welding individual airfoils 64 to the hub 63.

One or more rows of vanes 66 are positioned along the engine axis A and adjacent to the airfoils 64 to direct flow in the gas path GP. The vanes 66 can be mechanically attached to the engine static structure 38. An array of seals 68 are distributed about each row of airfoils 64 to bound the gas path GP.

One or more of the rotors 62 is mechanically attached or otherwise fixedly secured to an elongated, rotatable shaft 70. The shaft 70 is rotatable about the engine axis A. In examples, the shaft 70 interconnects a turbine and a compressor, such as one of the shafts 40, 50 of FIG. 1.

The rotor assembly 60 includes at least one annular seal 74. The seal 74 can be located at one or more of the stages of the section 58, such as an intermediate stage as illustrated by seal 74, and/or a forwardmost or aftmost stage indicated by seals 74', 74" of rotor assemblies 60', 60" (seals shown in dashed lines). Each rotor assembly 60 can have a single seal as illustrated by seals 74, 74' or can have multiple seals as illustrated by seals 74" of rotor assembly 60".

Figure 3:
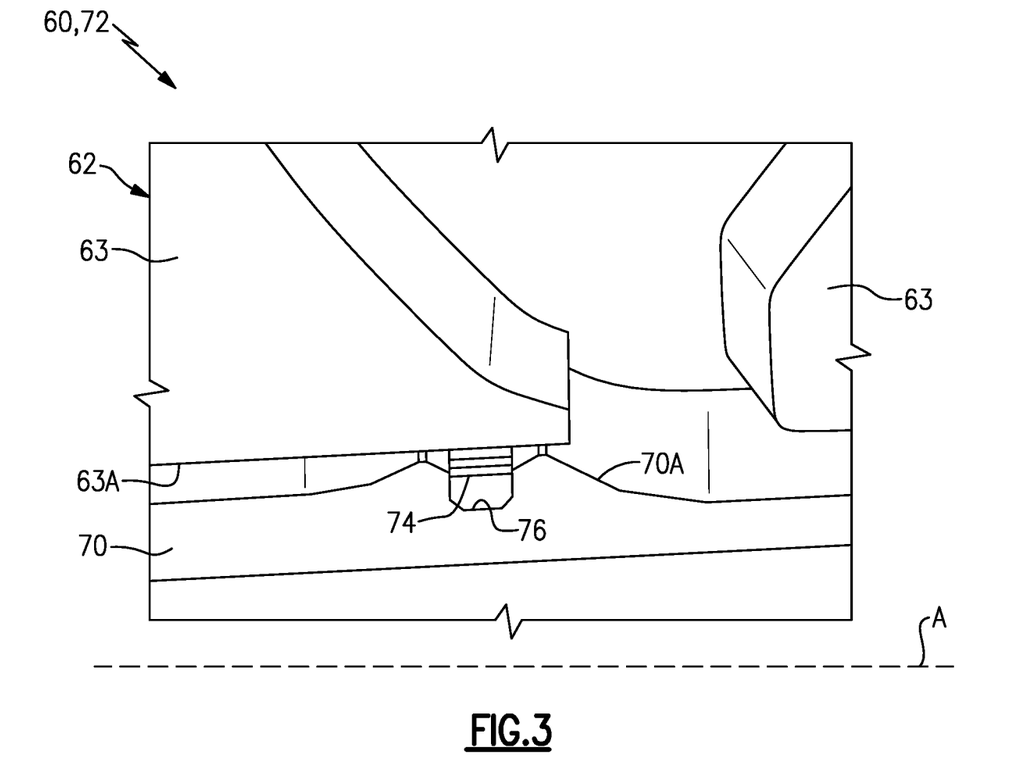
FIG. 3 illustrates an enhanced view of a portion of the rotor assembly of FIG. 2.
Figure 4:
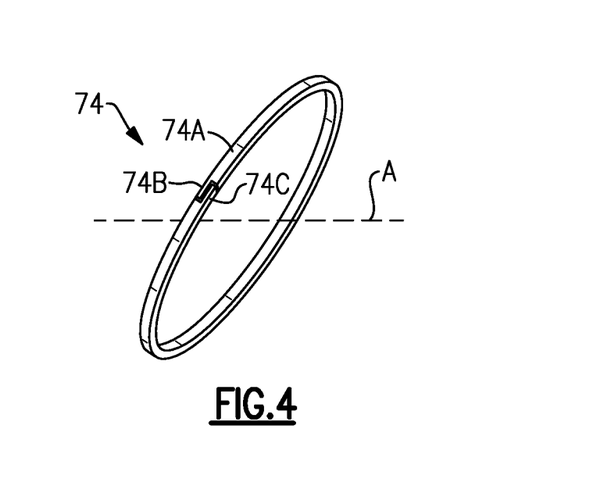
FIG. 4 illustrates a perspective view of a seal for the rotor assembly of FIG. 2.

FIG. 3 illustrates an enhanced view of a portion 72 of the rotor assembly 60. The annular seal 74 is carried by the shaft 70 for establishing a sealing relationship between the hub 63 of the rotor 62 and the shaft 70 to block or reduce communication of flow between adjacent cavities defined by the rotor 62 and shaft 70. A cross section of the shaft 70 can have a circular or otherwise generally elliptical geometry. The seal 74 can be a piston ring having a hoop-shaped geometry, as illustrated in FIG. 4. In the illustrated example of FIG. 4, the seal 74 is a split ring including a main body 74A extending between first and second ends 74B, 74C. The first end 74B engages with the second end 74C at an interface. In other examples, the main body 74A is continuous to form a full hoop.

The seal 74 is dimensioned to extend about a circumference of the shaft 70. An outer diameter portion 70A of the shaft 70 defines an annular groove 76 that is dimensioned to receive at least a portion of the seal 74. The seal 74 is seated in the groove 76 to establish a sealing relationship with an inner diameter portion 63A of the hub 63. The seal 74 can be exposed to relatively high temperatures due to proximity to the gas path GP and other portions of the engine 20.

Figure 5:
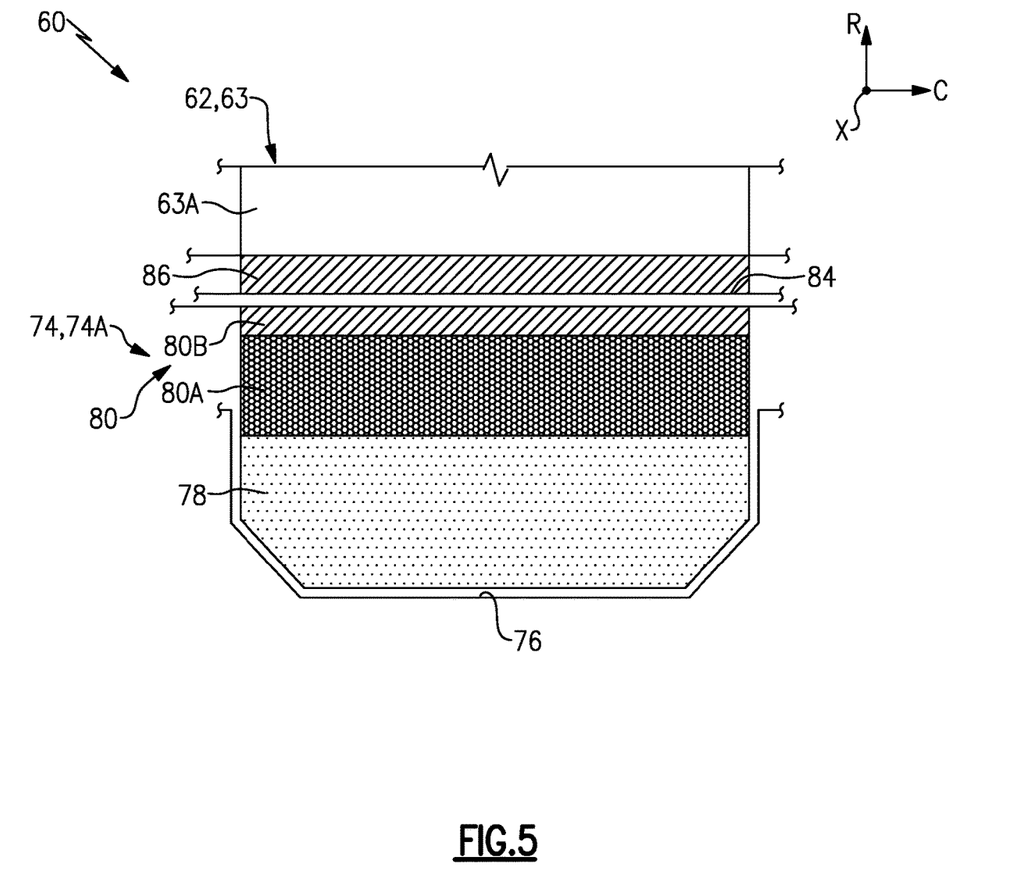
FIG. 5 illustrates a sectional view of the rotor assembly of FIG. 2.

Referring to FIG. 5, with continued reference to FIGS. 3 and 4, the seal 74 is a multi-layer seal including a substrate 78 and a coating 80 including a plurality of layers. In the illustrated example of FIG. 5, the coating 80 includes at least a first layer 80A and a second layer 80B. At least the substrate 78 is seated in the groove 76, and the coating 80 is situated between the substrate 78 and the hub 63. The second layer 80B can define an external surface of the seal 74. The inner diameter portion 63A of the hub 63 defines a counter face or seal land. The second layer 80B abuts against the inner diameter portion 63A of the hub 63 or is otherwise in close proximity to the seal land to establish a sealing relationship with the hub 63 along an interface 84.

The first layer 80A can be disposed directly on the substrate 78. The second layer 80B can be disposed directly on the first layer 80A. In other examples, one or more layers of material are formed between the substrate 78 and first layer 80A and/or between the first and second layers 80A, 80B. In the illustrated example of FIG. 5, the hub 63 includes a third layer 86 deposited on surfaces of the inner diameter portion 63A along the interface 84 to establish the seal land. In other examples, the third layer 86 is omitted.

Various materials can be utilized to form the rotor assembly 60. The substrate 78 can be made of a first material, the first layer 80A can be made of a second material, and the second layer 80B can be made of a third material. The first, second and/or third materials can differ in composition and/or construction. The substrate 78 and the rotor 62 can comprise a high temperature metal or metal alloy, such as a nickel alloy. Example nickel alloys include nickel chromium alloy sold under the tradename INCONEL® alloy 718 (IN718) and Direct Age Processed Alloy 718 (DA718). In the illustrated example of FIG. 5, the substrate 78 is made of IN718 and at least the inner diameter portion 63A of the hub 63 is made of DA718.

The first layer 80A may be a relatively soft metal or metal alloy coating comprising copper or a copper alloy including aluminum or nickel, for example. In other examples, the first layer 80A is a nickel-based or molybdenum-based metal or metal alloy.

The second layer 80B can be a low friction coating comprising a solid lubricant, with the second layer 80B having a lesser hardness than the first layer 80A. In examples, the first layer 80A has a hardness of about 100-300 diamond pyramid hardness (DPH), and the second layer 80B has a hardness of about 1 gigapascals (GPa) or less measured by means of nanoindentation. The solid lubricant can reduce a coefficient of friction (COF) between the seal 74 and the rotor 62 along the interface 84, with the second layer 80B having a relatively lower COF than the first layer 80A of the coating 80.

Example solid lubricants include molybdenum disulfide ($MoS_2$), boron nitride, and tungsten disulfide. The solid lubricant can include silicate as a binder. Other example solid lubricants can include carbon-based and graphite-based materials. In some examples, the solid lubricant is compounded with another material to form a self-lubricating composite such as a $MoS_2$-ceramic composite. Other example solid lubricants include tungsten disulphide ($WS_2$).

In the illustrated example of FIG. 5, the first layer 80A of the coating 80 is a layer of copper alloy disposed on the substrate 78, and the second layer 80B is a solid lubricant comprising molybdenum disulfide ($MoS_2$) that is deposited as a film on the first layer 80A. A hardness of the copper-based coating can be relatively lower than other materials to reduce wear of the counter face and the solid lubricant that may otherwise occur due to the interface.

In examples, the first layer 80A has a composition, by weight percent, of about 60% to about 95% copper. In some examples, the first layer 80A has a composition, by weight percent, of about 85% to about 95% copper, and aluminum. In other examples, the first layer 80A has a composition, by weight percent, of about 60% to about 65% copper, and nickel. In example, the first layer 80A has a composition of copper including any of the weight percentages disclosed herein, and the balance is aluminum or nickel. For the purposes of this disclosure, the term "about" means±3% of the disclosed weight percent value unless otherwise stated.

The third layer 86 can be a solid lubricant made of any of the materials disclosed herein. In the illustrated example of FIG. 5, the third layer 86 comprises molybdenum disulfide ($MoS_2$). Applying a solid lubricant to the inner diameter portion 63A of the hub 63 can reduce a running-in period (i.e., the initial transfer of the solid lubricant), which can improve sealing efficiency and durability.

During operation, the shaft 70 and each rotor 62 rotate as an assembly about the engine axis A. The seal 74 may move relative to the hub 63 along the interface 84 in axial, radial and/or circumferential directions X, R, C. The axial direction X can be coincidental or parallel to the engine axis A. Sliding or movement of the seal 74 along the interface 84 in the axial and/or circumferential directions X, C may occur due to relatively high vibratory energy in the system. The solid lubricant can reduce the COF and frictional heating along the interface 84, which can reduce galling and other wear along the adjacent surfaces and can increase durability of the seal 74 and the rotor 62. Reduced wear can reduce overhaul costs that may otherwise be associated with replacement or refurbishment of the seal 74 and/or rotor 62.

Figure 6A:
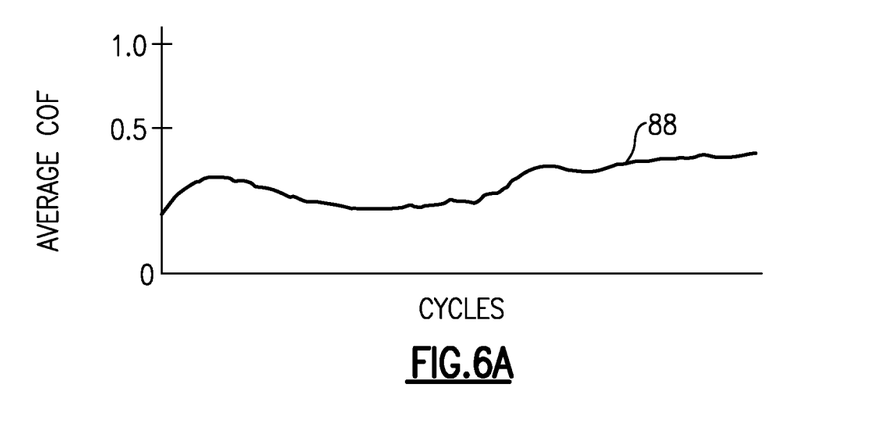
FIG. 6A illustrates an example plot of coefficient of friction (COF) versus cycles of a rotor assembly.
Figure 6B:
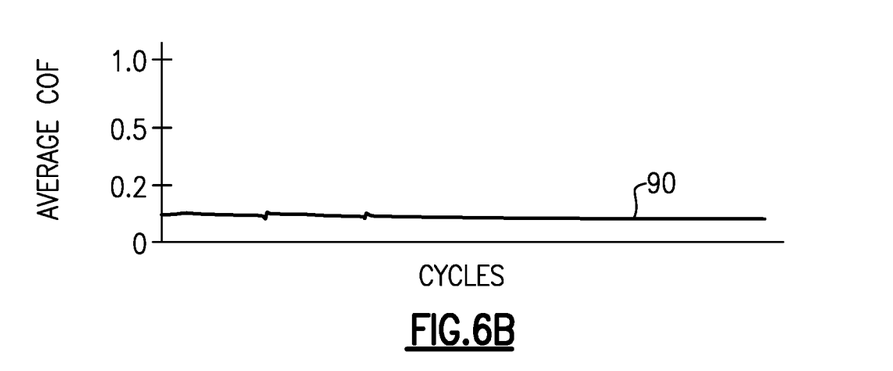
FIG. 6B illustrates an example plot of COF versus cycles of another rotor assembly.

FIGS. 6A and 6B illustrate example plots of COF versus cycles of rotor assemblies. The x-axis corresponds to the number of cycles of movement of the respective seal relative to the interface. The y-axis corresponds to the average COF. Values along the y-axis correspond to movement of the seal in a first direction. FIG. 6A illustrates curve 88 corresponding to average COF values for a seal having a copper-based coating free of a solid lubricant. FIG. 6B illustrates curve 90 corresponding to average COF values for the seal 74 having a copper-based coating and a MoS2-based solid lubricant.

As illustrated by FIGS. 6A and 6B, the copper-based coating including a solid lubricant can reduce the average COF as compared to coatings free of a solid lubricant. In the illustrative example of FIG. 6B, the seal 74 has an average COF of less than 0.2, whereas the average COF of curve 88 is greater than 0.2 and approach 0.5 for a comparable number of cycles. The combination of materials of the substrate 78, layers 80A, 80B of coating 80 and/or hub 63 can reduce wear adjacent the first and second ends 74B, 74C of the seal 74 and adjacent portions of the hub 63.

Figure 7:
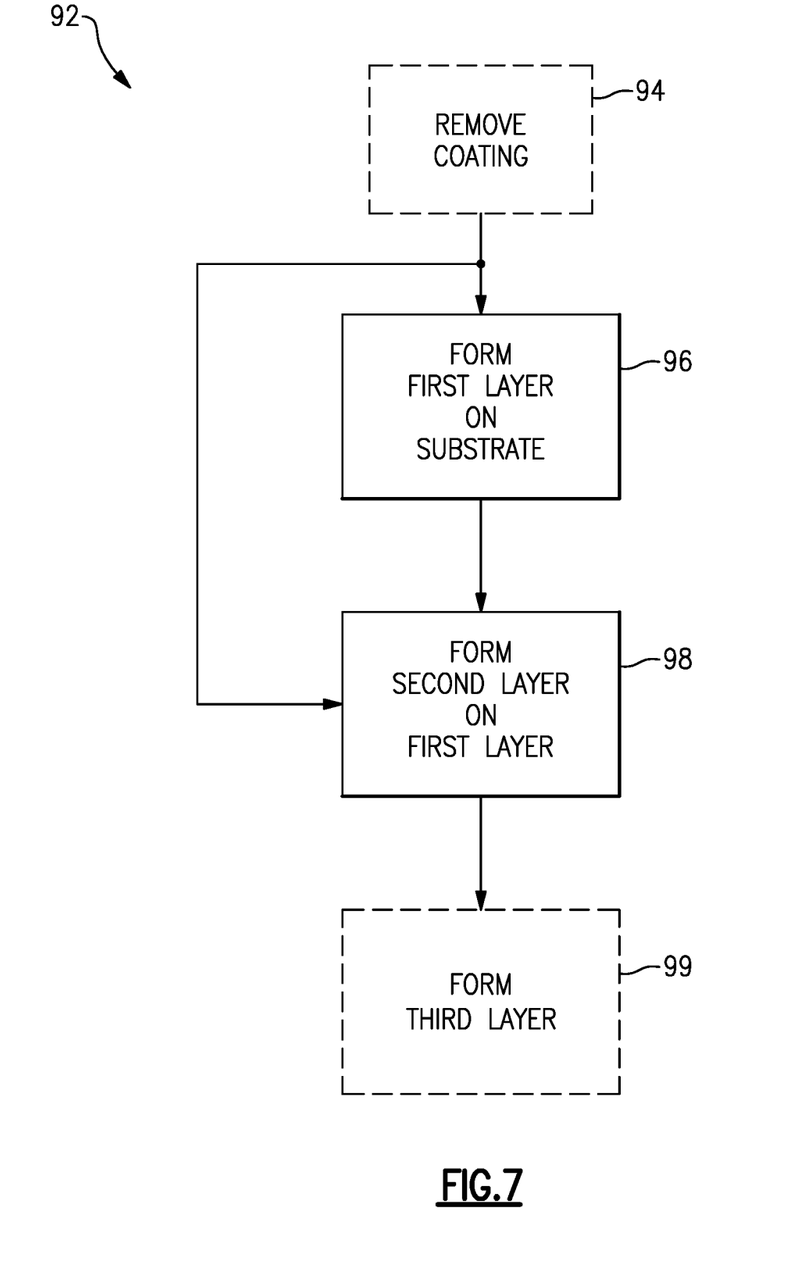
FIG. 7 illustrates an example process for forming a rotor assembly.

FIG. 7 illustrates a process for forming a rotor assembly, including any of the seals and rotor assemblies disclosed herein. Reference is made to the seal 74 and rotor assembly 60 of FIGS. 3-5 for illustrative purposes. In some examples, a coating including one or more layers of material is removed from surfaces of substrate 78 at step 94, including at least a previously applied second layer 80B comprised of a solid lubricant.

The first layer 80A is deposited or otherwise formed on the substrate 78 at step 96. The first layer 80A can be formed on the substrate 78 utilizing various techniques, such as by plasma spray deposition or another thermal spraying technique. Other example techniques for forming the first layer 80A can include physical vapor deposition (PVD) and chemical vapor deposition (CVD). In examples, step 94 includes removing a previously applied first layer 80A such as a layer of copper alloy from the substrate 78 prior to step 96. The previously applied first layer 80A may be removed after about 10,000-12,000 operating cycles of the engine, whereas a previously applied second layer 80B may be removed after a lesser number of operating cycles, such as approximately 1000 operating cycles, for example.

At step 98 the second layer 80B comprising a solid lubricant is deposited or otherwise formed on the first layer 80A. In some examples, at step 99 the third layer 86 comprising a solid lubricant is deposited or otherwise formed on the hub 63. A previously applied third layer 86 can be removed prior to step 96. The second and third layers 80B, 86 can be applied utilizing various techniques, such as brushing, swabbing, or spraying including any of the spraying techniques disclosed herein. In examples, the second and/or third layers 80B, 86 are applied by physical vapor deposition (PVD) or chemical vapor deposition (CVD). The first, second and/or third layers 80A, 80B, 86 may include one or more sublayers. One or more layers of material may be formed on and/or between the layers 80A, 80B, 86. Various finishing operations can be applied once the respective layers 80A, 80B, 86 are formed.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A rotor assembly for a gas turbine engine comprising:
a rotor including a hub carrying one or more rotatable blades, the rotor mechanically attached to a shaft; and
an annular seal carried by the shaft, wherein the annular seal comprises:
a substrate;
a first layer disposed on the substrate, the first layer comprising copper; and
a second layer disposed on the first layer and arranged to establish a sealing relationship with the rotor along an interface, the second layer comprising a solid lubricant, and the solid lubricant comprising molybdenum disulfide (MoS2); and
wherein the second layer of the seal abuts against an inner diameter portion of the hub along the interface, and the hub includes a solid lubricant disposed on the inner diameter portion of the hub to establish the interface.

2. The rotor assembly as recited in claim 1, wherein the substrate comprises a nickel alloy.

3. The rotor assembly as recited in claim 1, wherein the first layer comprises aluminum or nickel.

4. The rotor assembly as recited in claim 3, wherein the first layer has a composition, by weight percent, 60% to 95% copper.

5. The rotor assembly as recited in claim 1, wherein the rotor is an integrally bladed rotor.

6. The rotor assembly as recited in claim 5, wherein the first layer has a composition, by weight percent, 85% to 95% copper, and aluminum.

7. The rotor assembly as recited in claim 5, wherein the first layer has a composition, by weight percent, 60% to 65% copper, and nickel.

8. The rotor assembly as recited in claim 5, wherein the annular seal is a split ring including a first end that engages with a second, opposed end.

9. The rotor assembly as recited in claim 8, wherein the solid lubricant of the second layer is a MoS2-ceramic composite.

10. The rotor assembly as recited in claim 8, wherein the solid lubricant of the hub comprises molybdenum disulfide (MoS2).

11. The rotor assembly as recited in claim 5, wherein the substrate of the annular seal is seated in an annular groove defined by an outer diameter portion of the shaft.

12. The rotor assembly as recited in claim 5, wherein the integrally bladed rotor is a compressor rotor.

13. A gas turbine engine comprising:
a fan section including a fan;
a compressor section including a compressor;
a turbine section including a turbine driving the compressor;
a shaft rotatable about an engine longitudinal axis;

wherein the compressor section includes a rotor assembly, the rotor assembly comprising:
- a rotor including a hub carrying a plurality of rotatable blades, the rotor mechanically attached to the shaft;
- a piston ring carried by the shaft, the piston ring comprising a first layer of copper alloy disposed on a substrate, and a second layer that abuts against an inner diameter portion the hub along an interface to establish a sealing relationship, the second layer comprising a solid lubricant, and the solid lubricant comprising molybdenum disulfide (MoS2); and
- wherein the hub includes a solid lubricant disposed on the inner diameter portion of the hub to establish the interface.

14. The gas turbine engine as recited in claim 13, wherein the rotor is an integrally bladed rotor.

15. The gas turbine engine as recited in claim 14, wherein the compressor section includes a low pressure compressor and a high pressure compressor, and the integrally bladed rotor is a high pressure compressor rotor of the high pressure compressor.

16. A method of sealing for a gas turbine engine comprising:
- forming a piston ring comprising a first layer of copper alloy disposed on a substrate, and a second layer that abuts against a rotor to establish a sealing relationship, the second layer comprising a solid lubricant, and the solid lubricant comprises molybdenum disulfide (MoS2);
- mechanically attaching the rotor to a rotatable shaft, the rotor including a hub carrying one or more rotatable blades; and
- removing a layer of copper alloy from the piston ring prior to the forming step.

17. The method as recited in claim 16, wherein the rotor is an integrally bladed rotor.

18. The method as recited in claim 17, wherein the step of forming includes depositing the second layer directly on the first layer.

19. The method as recited in claim 16, wherein the hub defines a seal land that forms a sealing relationship with the second layer, and further comprising forming a third layer on the seal land, the third layer comprising molybdenum disulfide (MoS2).

20. The method as recited in claim 16, further comprising depositing a solid lubricant on an inner diameter portion of the hub to establish an interface with the second layer of the piston ring.

* * * * *